United States Patent [19]

Chalkley et al.

[11] Patent Number: 5,380,354
[45] Date of Patent: Jan. 10, 1995

[54] RECOVERY OF METALS FROM SULPHIDIC MATERIAL

[75] Inventors: Michael E. Chalkley, St. Albert; Ian M. Masters; Barry N. Doyle, both of Fort Saskatchewan, all of Canada

[73] Assignee: Sherritt Inc, Fort Saskatchewan, Canada

[21] Appl. No.: 237,986

[22] Filed: May 4, 1994

[30] Foreign Application Priority Data

May 4, 1993 [GB] United Kingdom ............... 93091445

[51] Int. Cl.⁶ .......................................... C22B 15/08
[52] U.S. Cl. ......................................... 75/743; 423/27
[58] Field of Search ........................... 75/743; 423/27

[56] References Cited

U.S. PATENT DOCUMENTS

| | | | |
|---|---|---|---|
| 3,954,450 | 5/1976 | Kuhn | 75/743 |
| 4,606,763 | 8/1986 | Weir | 75/743 |
| 4,614,543 | 9/1986 | Duyvesteyn | 75/743 |
| 4,671,945 | 6/1987 | Thomassen | 75/473 |
| 4,676,828 | 6/1987 | Andre | 75/743 |

Primary Examiner—Peter D. Rosenberg
Attorney, Agent, or Firm—Arne I. Fors; D. Doak Horne; Jeffrey T. Imai

[57] ABSTRACT

A process for recovering zinc and iron from zinc- and iron-containing sulphidic material, which also contains lead and silver, in which the sulphidic material is leached under oxidizing conditions in a two stage countercurrent pressure leach to produce a zinc-containing solution from which zinc can be recovered by conventional means such as electrowinning, followed by a reducing leach to produce a lead- and silver-bearing product containing substantially all of the lead and a substantial portion of the silver present in the zinc-containing sulphidic materials, and a high strength iron bearing solution having the iron in the ferrous state from which substantially pure, saleable or environmentally acceptable iron residue in the form of hematite which contains the majority of the soluble iron present in the zinc-containing sulphidic materials is produced.

10 Claims, 5 Drawing Sheets

RECOVERY OF METALS FROM SULPHIDIC MATERIAL

BACKGROUND OF THE INVENTION

This invention relates to a process for the recovery of zinc and other non-ferrous metal values from sulphidic material which also contains iron, and to produce a marketable iron product.

Bulk zinc, lead, copper and iron concentrates are produced at several locations throughout the world from the treatment of complex sulphide ores. In some locations, bulk concentrates are produced together with conventional concentrates of the individual metals. For other orebodies, the treatment of ore for metal recovery is only economical if a bulk concentrate, containing all the metals of interest, is produced. Such bulk concentrates are treated almost exclusively in Imperial Smelting Furnaces.

Although it has long been desired to develop a hydrometallurgical route for the treatment of bulk concentrates either to produce higher grade zinc or eliminate the sulphur dioxide emissions and sulphuric acid production requirements common to smelter operations, commercialization of such a route has not been successful.

Conventional zinc concentrates, containing about 50% Zn, 5 to 10% Fe, a maximum of 3.5% Pb and less than 1% Cu, can be treated by a dead roasting process to convert zinc sulphide to a mixture of zinc oxide and zinc ferrite. The zinc ferrite content of the calcine product is dependent on the iron content of the zinc concentrate and normally from 5 to 20% of the zinc is present as weak acid insoluble ferrite. Calcine is treated in a weak acid leach circuit to dissolve zinc oxide and to produce a solution from which zinc can be recovered by electrolysis after a purification step. Zinc ferrite however is unattacked in the weak acid leach and must be subjected to a separate hot acid leach to dissolve the ferrite. In this step, iron also dissolves and must be precipitated from solution before the dissolved zinc is recycled to the weak acid leach circuit, Several processes, such as jarosite precipitation, goethite precipitation, paragoethite precipitation and hematite precipitation have been developed for the precipitation of iron from hot acid leach solution.

Bulk concentrates have lower zinc content and higher lead, iron and copper contents than conventional zinc concentrates. Two problems exist in the treatment of bulk concentrate by a dead roasting process. Firstly, the low zinc and high iron content of the concentrate ensures that most or all of the zinc is converted to zinc ferrite which can only be treated by a hot acid leach. Insufficient zinc oxide is produced to neutralize the excess acid present in the hot acid leach solution. Secondly, the calcine produced when the combined copper and lead content of the concentrate is high tends to agglomerate in the roaster bed. However, small quantities of bulk concentrate have been successfully blended with conventional concentrates as a feed to a dead roast.

The New Brunswick Research and Productivity Council developed a sulphation roast process for the treatment of bulk concentrates, see J. Synnott et al., "Iron control in the RPC sulphation roast-leach process", in Iron Control in Hydrometallurgy, eds. J. E. Dutrizac and A. J. Monhemius, Ellis Horwood, Chichester, 1986, pp. 56–64. The concept of the sulphation roast was successfully demonstrated in a 10 t/d pilot plant, but the corrosive nature of the roaster off gas posed major equipment problems, and severe problems were experienced with the water and sulphate balance in the hydrometallurgical circuit used to treat the calcine.

Several attempts have been made to develop a hydrometallurgical chloride route for the treatment of bulk concentrates. The U.S. Bureau of Mines, see M. M. Wong et al., "Integrated operation of ferric chloride leaching, molten-salt electrolysis process for production of lead", U.S. Department of the Interior, Report of Investigation 8770, 1983, Dextec in Australia; see P. K. Everett, "The Dextec lead process", in Hydrometalllurgy Research, Development and Plant Practice, eds. K. Osseo-Asare and J. D. Miller, TMS, Warrendale, Pa., 1983, pp. 165–173", Elkem in Norway; see E. Andersen et al., "Production of base metals from complex sulphide concentrates by the ferric chloride route in a small continuous plant", in Complex Sulphide Ores, ed. M. J. Jones, IMM, London, 1980, pp. 186–192, BRGM in France; see C. Palvadeau, "Further developments in the electrolysis of lead from chloride electrolytes: pilot plant progress report", in Extraction Metallurgy '85, IMM, London, 1985, pp. 967–977, and CANMET in Canada; and see "The ferric chloride leach process for the treatment of bulk base metal sulphide concentrates", CANMET Report 89-4 (OP & J), CANMET, Energy Mines and Resources Canada, Ottawa, 1989, have each conducted major research programs. None of these processes has advanced to commercialization.

Sherritt Inc has been investigating the treatment of bulk zinc-lead-copper concentrates by pressure leaching since 1977. Several flowsheets have been developed. The flowsheet of FIG. 1 illustrates a single stage pressure leach in which the majority of the iron which was extracted from the concentrate was precipitated in the autoclave, primarily as plumbojarosite. Limestone and zinc dross were added to the leach solution to neutralize free acid present in the leach solution and precipitate residual soluble iron. The leach residue, containing lead, silver and iron, was digested in sulphuric acid to produce a lead/silver residue and a solution containing acid and iron. The leach solution was treated with limestone to produce an iron oxide/gypsum precipitate.

A major drawback of the single stage pressure leach process is the large amount of limestone required to neutralize acid and precipitate iron and the production of a large quantity of low grade iron oxide/gypsum residue which must be ponded.

Subsequent testwork led to the development of a two stage countercurrent pressure leach of bulk concentrate shown in FIG. 2, see M. E. Chalkley et al, "A Sherritt pressure leaching process: non-ferrous metals production from complex sulphide concentrates" presented at the Canada/EC Seminar on the Treatment of Complex Minerals; Ottawa, Oct. 12–14, 1982. In this case, the limestone requirements for the leach solution were reduced due to better acid utilization and more complete iron precipitation in the autoclave. Again, the majority of the dissolved iron was precipitated in the autoclave, primarily as plumbojarosite. The plumbojarosite residue was separated from the sulphidic fraction of the leach residue by flotation and subsequently treated with sulphur dioxide in a reduction leach to dissolve the plumbojarosite and produce a lead sulphate/silver residue. It was proposed to neutralize the reduction leach solution with lime or limestone and produce an iron oxide/gypsum residue.

The two stage countercurrent pressure leach offered some advantages over the single stage leach, but produced a similar poor quality iron residue.

The desire to produce a lead/silver residue directly in the pressure leach led to further development work and a two stage cocurrent pressure leach, typified in FIG. 3, see U.S. Pat. No. 4,505,744, issued Mar. 19, 1985. It is known that a high grade lead/silver residue can be produced from the high acid pressure leaching of bulk concentrate. Conditions in the autoclave must be chosen such that precipitation of dissolved iron is minimized. This can be achieved by ensuring that sufficient acid is present in solution at all times to minimize iron hydrolysis and precipitation. A high grade lead and silver residue can then be separated from the leach residue by flotation. While lead recovery from the bulk concentrate will be high, silver recovery will be dependent on the mineralogical form of silver in the bulk concentrate. Silver which is dissolved in the high acid leach may be precipitated from solution as silver sulphide which will report to the sulphidic fraction of the leach residue. The leach solution typically contains more than 50 g/L $H_2SO_4$ and 10 to 15 g/L Fe and must be treated further to neutralize acid and precipitate iron before it can be forwarded to purification and electrolysis for zinc recovery. This treatment can be conveniently carried out in a second pressure leach step by reacting the solution with a conventional zinc concentrate under conditions which will favour the consumption of acid and the precipitation of iron. In order to minimize the loss of lead and silver, this zinc concentrate should preferably have a low lead and silver content. Iron is precipitated as a mixture of jarosites, other basic iron sulphates and hydrated iron oxides. The iron residue is separated from the leach residue by flotation and is ponded.

The two stage cocurrent leach process allows for the direct recovery of lead and silver from bulk concentrate in the pressure leach. However, two concentrates are required, with the ratio of bulk concentrate:zinc concentrate being about 0.67:1. Such a flowsheet may have merit for an orebody from which both conventional and bulk concentrates can be produced. As is the case with the previously described flowsheets, however, the iron residue is of low grade and must be ponded.

With increasing environmental concern about the disposal of iron residues, the two stage cocurrent leach flowsheet was expanded to include the precipitation of iron as hematite, FIG. 4, described in co-pending U.S. patent application No. 08/217,902. High acid leach solution was subjected to a neutralization/reduction stage with zinc concentrate, followed by neutralization with lime to produce a solution from which iron is precipitated in an autoclave as hematite. The hematite precipitation end solution is then treated with zinc concentrate in a low acid leach to neutralize acid and precipitate residual iron. The iron residue from the low acid leach is separated from the sulphidic fraction of the leach residue by flotation and is leached in spent electrolyte under atmospheric pressure to dissolve the precipitated iron compounds and produce a lead/silver residue which is combined with the lead/silver residue produced in the high acid leach. The leach solution from this iron dissolution step is recycled to the high acid leach, thus ensuring that substantially all of the iron leached from both concentrates is rejected as high grade hematite precipitate.

This flowsheet has a number of advantages. Because the iron residue produced in the low acid leach undergoes an iron dissolution step to recover lead and silver values, it is possible to increase the amount of bulk concentrate treated by replacing some or all of the zinc concentrate by bulk concentrate. The overall recovery of lead and silver will increase. A major advantage is the rejection of iron as an environmentally more acceptable and potentially marketable hematite product.

This flowsheet, however, has certain disadvantages. The iron in solution in the high acid leach discharge is mainly in the ferric state and the maximum concentration that can be maintained at an acceptable acid concentration will be less than 20 g/L. Consequently, the hematite precipitation circuit, which includes reduction and neutralization steps, must necessarily be large to treat the large volumes of solution produced. Since hematite precipitation is carried out at about 180° C. and the reaction is endothermic, large quantities of steam are required for heating. Further, the flowsheet is relatively complex, including two separate feed preparation systems and two separate leach residue flotation steps.

SUMMARY OF THE INVENTION

The objective of the present invention is to treat zinc and/or bulk zinc-lead-copper concentrate for a high recovery of zinc, lead and silver and produce a marketable iron product in a circuit with minimal capital and operating cost requirements. The flowsheet of the process of the invention allows the treatment of zinc concentrate, a combination of zinc concentrate and bulk concentrate or bulk concentrate alone, which will permit the maximization of metal recoveries in the flotation or concentrator operations. The use of a two stage countercurrent pressure leach allows for the operation of the simplest two stage leach circuit of the type shown in FIG. 2. With all the concentrate being fed to one leaching stage, the feed preparation and slurry feed systems are simplified. Only one flotation stage is required in the pressure leach circuit, since the total first stage leach residue is treated in the second stage. Because iron is dissolving and precipitating in both leaching stages, all the silver which is dissolved in the autoclave essentially reports to the iron residue and overall recovery of silver is increased.

The reduction leach of the iron residue concentrates the lead and silver into a single product and permits the production of a high strength iron leach solution. All the iron is in the ferrous state, and a high strength iron bearing solution, at least double the strength of that produced in the high acid leach step in the two stage cocurrent flowsheet shown in FIG. 4, is produced. Consequently, the equipment size and steam requirements in the hematite precipitation circuit are significantly reduced.

The process of the invention for recovering zinc and iron from zinc- and iron-containing sulphidic concentrate which also contains lead and silver comprises leaching the concentrate under pressurized oxidizing conditions at a temperature in the range of about 130° to 170° C. in aqueous acidic sulphate solution in a first stage leach, maintaining a mole ratio of acid to zinc plus lead in the concentrate in the range of 0.55:1 to 0.85:1, preferably about 0.7:1 in the first stage leach, to produce a leach solution of low acid and dissolved iron content for recovery of zinc therefrom, leaching the leach residue from the first stage leach under pressurized oxidizing conditions at a temperature in the range of 130° to 170° C. in aqueous acidic sulphate solution in a second stage leach, maintaining a mole ratio of acid to zinc plus lead in the leach residue from the first stage leach in the range of 1.2:1 to 1.4:1, preferably about 1.3:1, in the second stage leach to produce a leach solution high in zinc and a leach residue containing precipitated iron, lead and silver, recycling the leach solution to the first stage leach, separating the fraction of the second stage leach residue containing lead, silver and iron from the fraction containing sulphur and unleached sulphides, leaching the lead-, silver-, and iron-containing fraction of the second stage leach residue in aqueous acid sulphate solution under reducing conditions in a third stage leach to produce a leach solution containing iron in the ferrous state and a leach residue containing lead and silver, neutralizing the leach solution from the third stage leach for the removal of impurities from the solution, treating the said leach solution under oxidizing conditions at a temperature in the range of about 170° to 200° C. for the removal of iron therefrom as hematite, and recycling the solution after removal of iron to the first stage leach.

The third stage reducing leach preferably has sulphur dioxide as a reducing agent and may have elemental sulphur added thereto to precipitate copper. The leach solution from the first stage leach is neutralized to a pH of about 5 under oxidizing conditions for the precipitation of iron to produce a zinc sulphate solution containing less than 5 mg/L Fe for the recovery of zinc therefrom. The precipitated iron from the neutralized solution from the first stage leach may be fed along with the lead, silver and iron fraction of the second stage leach residue to the third stage reducing leach for dissolution of the iron in the ferrous state. However, depending on the nature of the neutralizing agent used to neutralize the first stage leach solution, treatment of the first stage leach neutralization residue in the reducing leach may result in dilution of the lead and silver values in the reducing leach residue with gypsum.

The leach solution containing ferrous iron from the third stage reducing leach preferably is neutralized in a first stage neutralization to a pH of about 1 with limestone or lime addition to produce a gypsum residue and the neutralized solution further neutralized in a second stage neutralization to a pH of about 4.5 by the addition of lime or limestone for the removal of impurity elements.

DESCRIPTION OF THE PREFERRED EMBODIMENT

Figure 1:
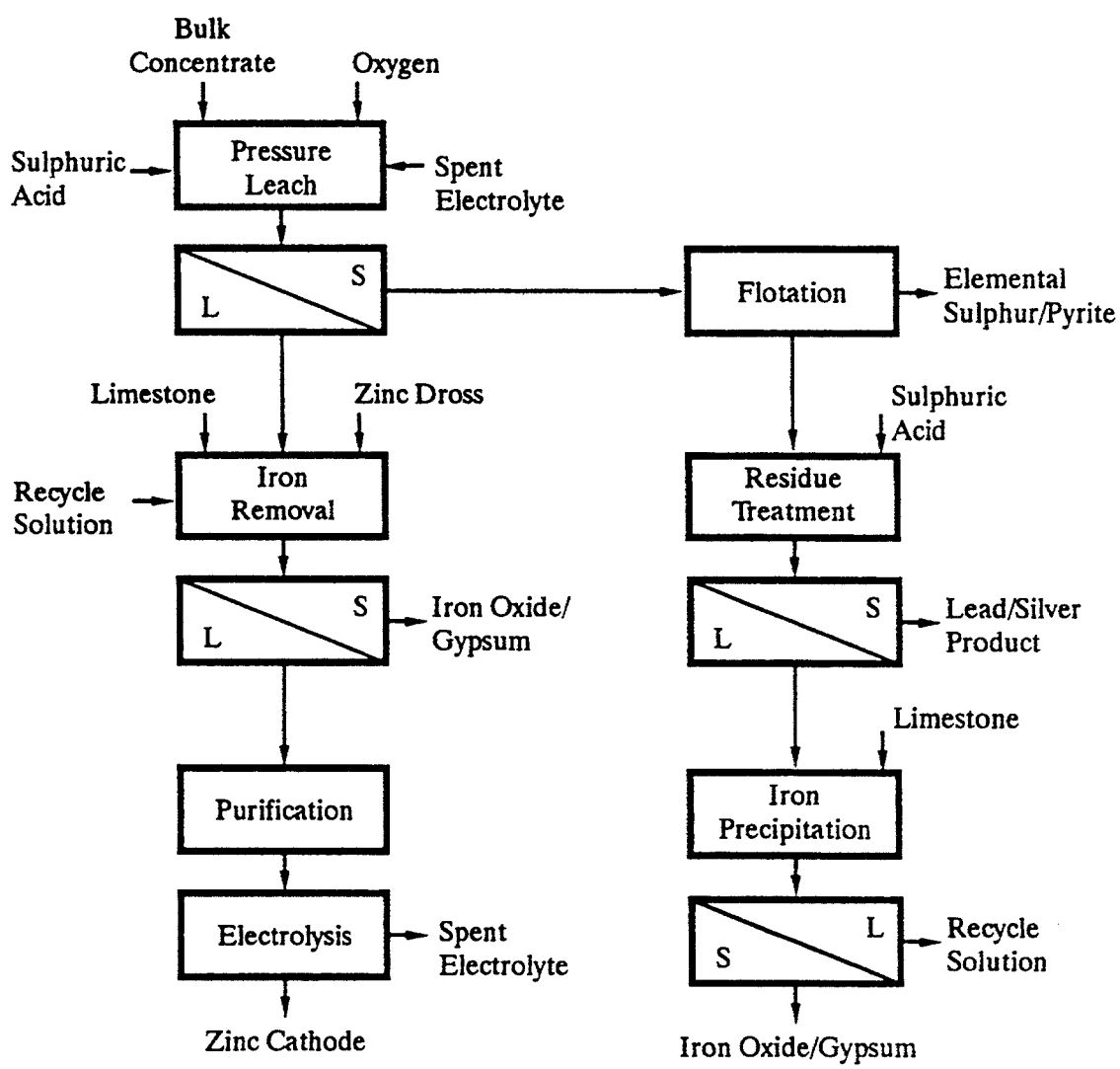
FIG. 1 is a flowsheet of a prior art single stage pressure leach.
Figure 2:
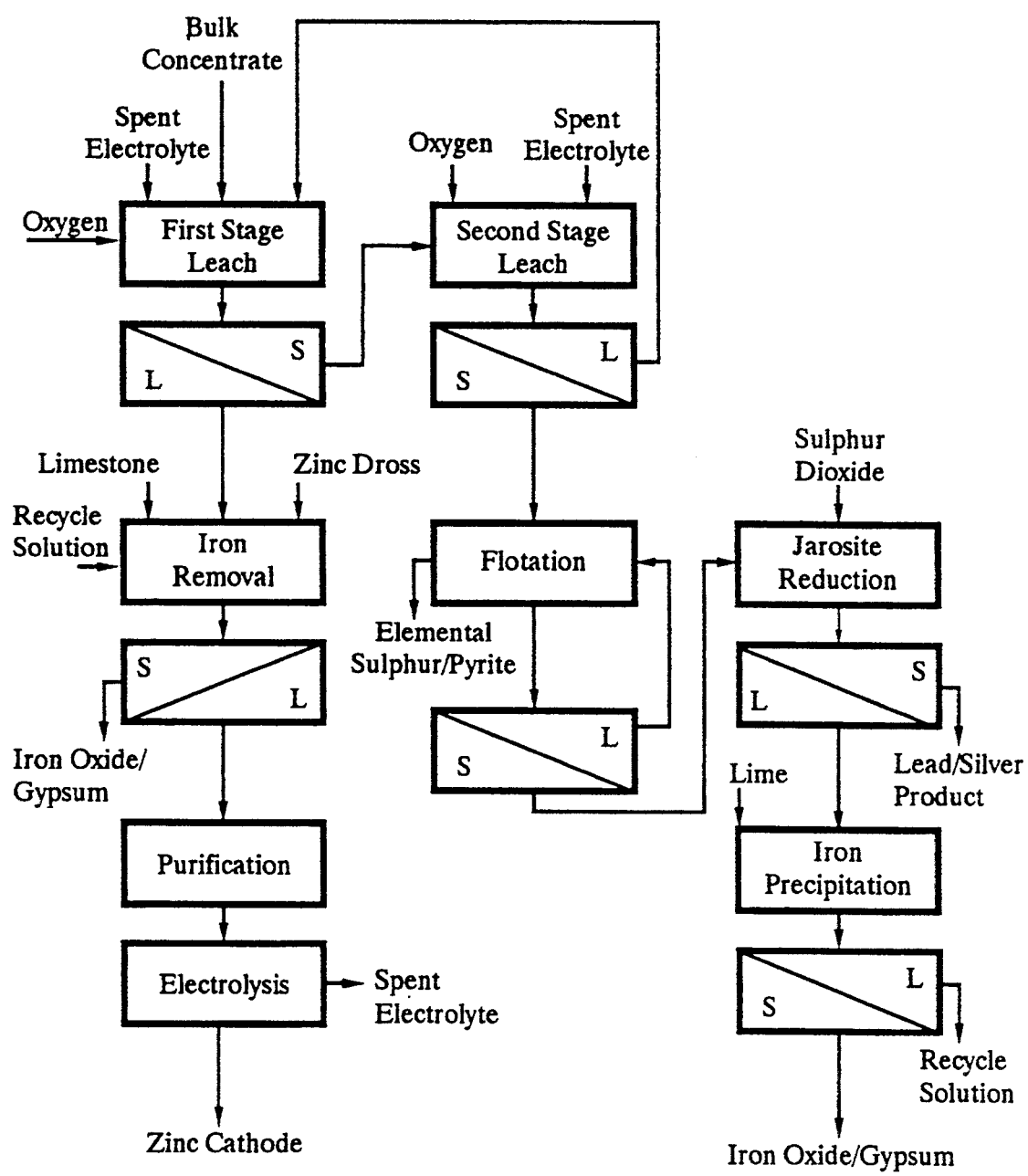
FIG. 2 is a flowsheet of a prior art two stage countercurrent pressure leach.
Figure 3:
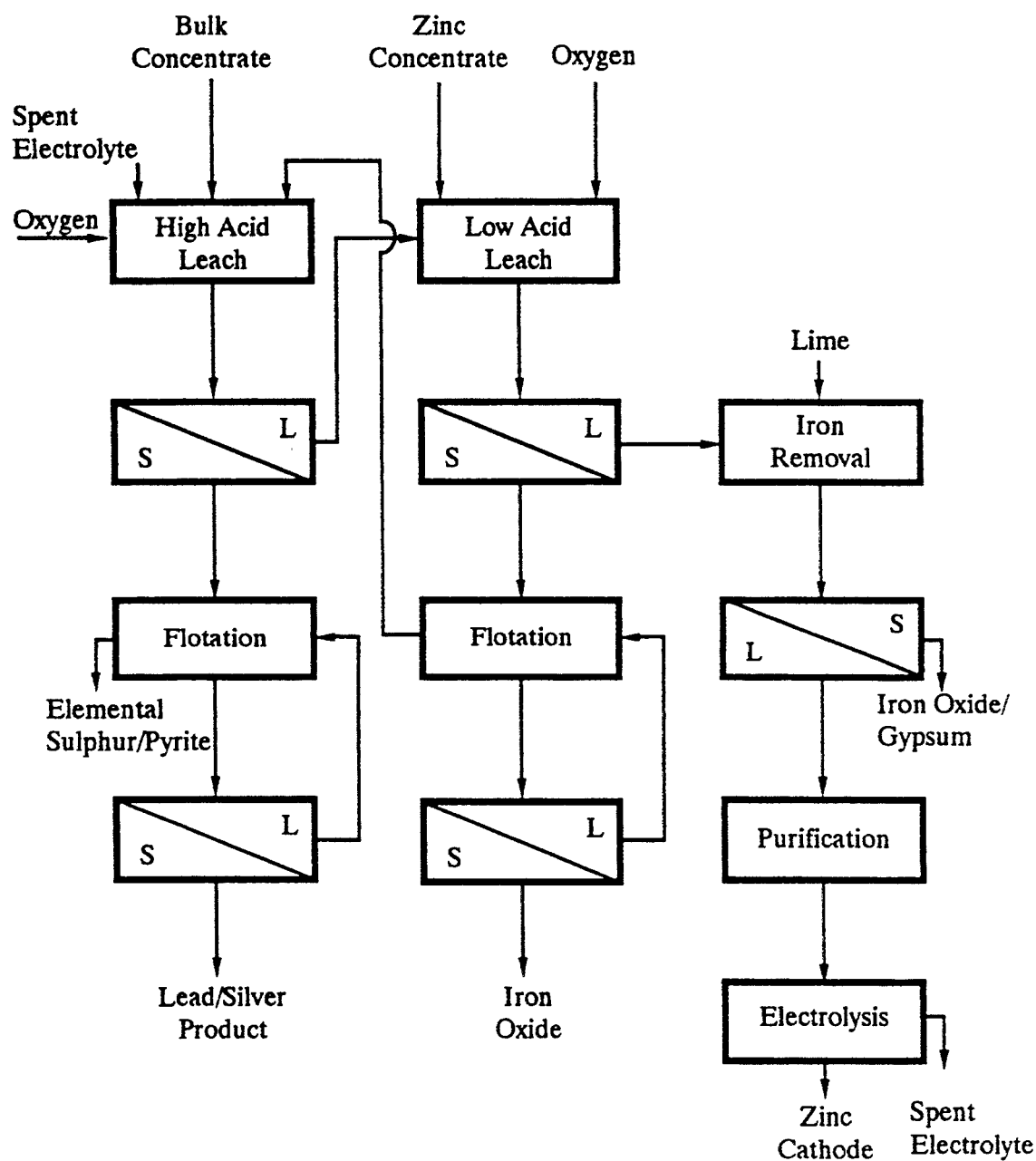
FIG. 3 is a flowsheet of a prior art two stage cocurrent pressure leach.
Figure 4:
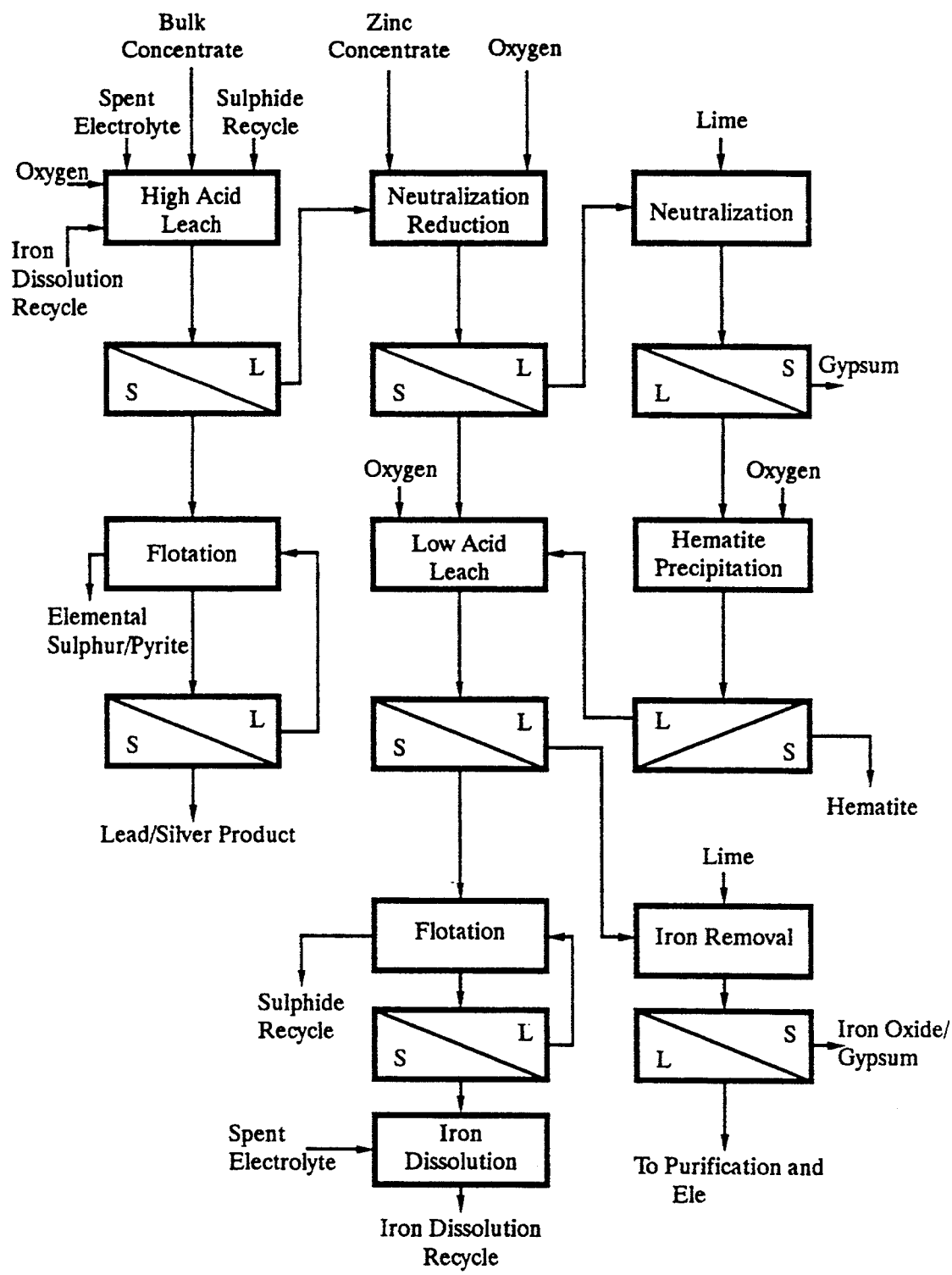
FIG. 4 is a flowsheet of a copending two stage cocurrent pressure leach.
Figure 5:
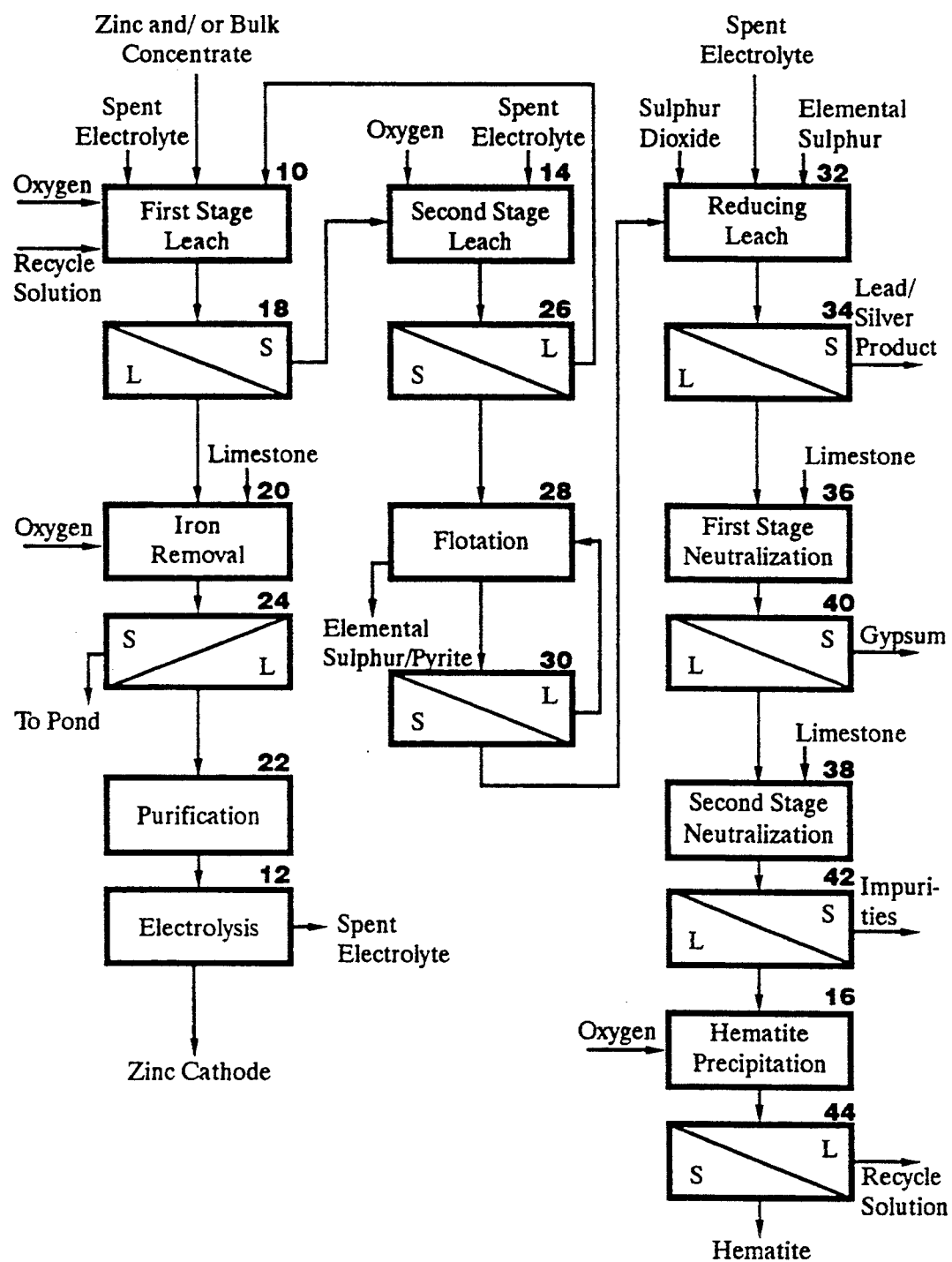
FIG. 5 is a flowsheet of a preferred embodiment of the process of the present invention.

The preferred embodiment of the invention will now be described, by way of example, with reference to FIG. 5. Zinc sulphide concentrate and/or bulk sulphide concentrate, containing zinc, lead, silver, copper and iron, is treated in a two stage countercurrent pressure leach process under oxidizing conditions in aqueous acidic sulphate solution at a temperature in the range of about 130° to about 170° C. in the manner disclosed in U.S. Pat. No. 4,004,991. It may be necessary to regrind the concentrate to at least 90% passing 44 microns prior to treatment in the pressure leach. In the first leaching stage 10, the total flow of concentrate is leached with a portion of the spent electrolyte solution from electrolysis 12, with the leach solution recovered from the second leaching stage 14 and with the hematite precipitation end solution from hematite precipitation 16. The objective of the first stage leach 10 is to consume the majority of the acid present in the feed solutions and to ensure that the majority of the iron present in these solutions and dissolved in this first leach stage is precipitated. This is achieved by maintaining a mole ratio of acid, including acid equivalent as iron sulphate, in the feed solutions to zinc plus lead in the feed concentrate in the range of 0.55:1 to 0.85:1, preferably about 0.7:1. Surface active additives, such as lignosulphonates and quebracho, described in U.S. Pat. No. 3,867,268, are added to the concentrate slurry to prevent premature wetting of unleached sulphide particles by molten elemental sulphur, and to control the particle size of the elemental sulphur/sulphide micropellets.

The leached slurry is discharged from the autoclave of first stage leach 10 to a thickener 18 where the leach solution is separated from the leach residue which contains elemental sulphur, unleached sulphides and precipitated iron compounds, particularly plumbojarosite. The thickener overflow solution is forwarded to the solution treatment and zinc recovery circuits which include iron removal 20, purification 22 of solution from liquid-solid separator 24, and electrolysis 12 for production of zinc cathode.

The first stage leach thickener underflow slurry is pumped to the second leaching stage 14 where it is contacted with a portion of the spent electrolyte under oxidizing conditions. The objective of the second stage of leaching is to achieve a high zinc extraction of the unleached zinc sulphide present in the first stage residue, thereby achieving a high overall zinc extraction in the process. This is achieved by maintaining a mole ratio of acid in the feed solution to zinc plus lead in the feed solids in the range of 1.2:1 to 1.4:1 preferably about 1.3:1. Surface active compounds, such as lignosulphonates and quebracho additives added to the first leaching stage 10 discussed above, are added to the second stage leach feed slurry to prevent premature wetting of unleached sulphide particles by molten elemental sulphur, and to control the particle size of the elemental sulphur/sulphide micropellets.

The leached slurry is discharged from the autoclave to a thickener 26 where the leach solution is separated from the leach residue which contains elemental sulphur, unleached sulphides, mainly pyrite, and precipitated iron compounds, including plumbojarosite, argentojarosite, hydronium jarosite and hydrated iron oxides. The thickener overflow solution is recycled to the first stage leach 10.

The leach thickener underflow slurry is pumped to a flotation circuit 28 where the elemental sulphur and unleached sulphides are separated from the oxidic fraction of the leach residue. A clean flotation concentrate, comprising elemental sulphur and unleached sulphides, mainly pyrite, can be further processed for the recovery of elemental sulphur by melting and filtration.

The flotation tailings contain the majority of the lead and silver present in the feed concentrate, together with the majority of the iron which was initially dissolved in the two stages of pressure leaching.

The flotation tailings are treated in a circuit for the recovery of the contained lead and silver values and the rejection of iron as a marketable iron oxide product, hematite. The flotation tailings pass to liquid solids separator 30 for recycle of the liquid to flotation 28 and the tailing solids are subjected to a reducing leach 32 in spent electrolyte with sulphur dioxide. The objective of the reducing leach is to dissolve all the precipitated iron species present in the flotation tailings. The products are a leach solution containing all the iron in the ferrous state and a leach residue which contains all the lead and silver present in the flotation tailings, in an upgraded form which is suitable as a feed to a lead smelter. Elemental sulphur may be added to the leach to precipitate copper which will report to the lead/silver product and can be separated by flotation. The leach residue is separated from the solution in a liquid solid separation step 34.

The leach solution recovered in liquid solid separation step 34, which contains ferrous iron, sulphuric acid and zinc, is subjected to two stages of neutralization to remove acid and also to precipitate impurities from the solution. The neutralization is conveniently carried out with limestone. In the first stage 36, a relatively pure gypsum product is obtained by raising the pH to 1 by the addition of limestone. In the second stage 38, the pH is raised to about 4.5 by the further addition of limestone and elements which would otherwise contaminate the hematite product are precipitated. It is beneficial to allow a small portion of the iron to be oxidized to the ferric state and precipitate in stage 38 to maximize the removal of impurity elements. Liquid solid separation steps 40, 42 separate the neutralization residues from the solution. The first stage gypsum product may be marketed, while the second stage neutralization impurity product may be the feed to a recovery process for the contained impurity elements, if economically viable.

The neutral solution, containing ferrous sulphate and zinc sulphate, is treated under oxidizing conditions in an autoclave in step 16 at a temperature in the range of 170° to 200° C. to precipitate hematite. Hematite is separated from the final slurry in a liquid solid separation step 44, and is washed to remove entrained solution. The hematite product can be marketed or ponded. The solution from hematite precipitation 16 preferably is recycled to first stage leach 10.

The leach solution from the first stage pressure leach 10 contains residual quantities of iron and sulphuric acid and is processed through the iron removal step 20. A neutralizing agent, such as limestone, is added, together with oxygen, to ensure neutralization of the acid and precipitation of iron. The neutralizing agent may conveniently be produced by the treatment of wash solutions and bleed solutions with lime to produce zinc hydroxide or basic zinc sulphate. The objective of the iron removal step 20 is to produce a neutral solution, pH about 5, containing less than 5 mg/L Fe. The neutralization residue from liquid solid separation step 24 may be impounded, or may be recycled to the reduction leach 32 to ensure that all the iron solubilized in the circuit is converted to hematite. The neutralized solution is treated for the recovery of zinc in conventional purification circuit 22 and electrowinning circuit 12.

The process of the invention will now be described with reference to the following non-limitative examples.

EXAMPLE 1

First Stage Leach

Bulk concentrate, containing 0.6% Cu, 17.8% Fe, 8.3% Pb, 0.021% Ag, 34.6% S and 28.2% Zn, and synthetic solution containing 1.6 g/L Cu, 6.5 g/L Fe, 45.5 g/L $H_2SO_4$ and 85.2 g/L Zn were fed continuously to the first compartment of a four compartment titanium-lined autoclave of 10 L working volume. The composition of the feed solution simulated a mixture of second stage leach solution and spent electrolyte from electrowinning of zinc. Calcium lignosulphonate and quebracho were added with the concentrate, at rates of 0.4 and 0.8 kg/t concentrate, respectively. Oxygen was sparged continuously into each compartment to maintain an oxygen overpressure of 350 kPa. The temperature was maintained at 150° C. The bulk concentrate was added as a 70% by weight solids slurry, at a rate of 2.9 kg/h solids and the solution was added at a rate 11.4 L/h, giving a slurry retention time in the vessel of approximately 45 minutes.

Slurry was continuously discharged from the last compartment of the vessel, to maintain the slurry level in the vessel. The discharge slurry was thickened, yielding a thickener underflow slurry containing 60% by weight solids. The compositions of the product solids and solution are given in Table I below. Zinc extraction was 52%.

TABLE I

| Product | Analysis, % or g/L | | | | | | | |
|---|---|---|---|---|---|---|---|---|
| | Cu | Fe | Pb | Ag | S | $SO_4$ | $H_2SO_4$ | Zn |
| Solids | 0.7 | 23.8 | 9.6 | 0.027 | 38.7 | 9.5 | NA | 15.6 |
| Solution | 2.0 | 0.8 | 0.01 | 0.0002 | NA | NA | 8.8 | 138 |

NA - Not analyzed.

EXAMPLE 2

Second Stage Leach

Thickener underflow slurry from the continuous first stage pressure leach test described in Example 1, 2.25 L of slurry containing 3100 g of solids, was charged to a 3 gallon (11.4.L) titanium-lined autoclave along with 5.25 L of synthetic spent electrolyte containing 57 g/L Zn and 151 g/L $H_2SO_4$, 0.75 g calcium lignosulphonate and 1.5 g quebracho. The mixture was heated to 150° C. for 90 minutes, with agitation. Oxygen was continuously admitted to the vessel through a sparge tube, to maintain 345 kPa oxygen overpressure. The compositions of the product solution and solids are given in Table II below. The combined zinc extraction in the two stages of pressure leaching was 92.5%.

TABLE II

| Product | Analysis, % or g/L | | | | | | | |
|---|---|---|---|---|---|---|---|---|
| | Cu | Fe | Pb | Ag | S | $S(SO_4)$ | $H_2SO_4$ | Zn |
| Solids | 0.5 | 26.7 | 10.8 | 0.032 | 45.4 | 11.7 | NA | 2.8 |
| Solution | 0.3 | 1.0 | 0.01 | 0.0002 | NA | NA | 24.2 | NA |

NA - Not analyzed.

EXAMPLE

Reducing Leach

Second stage leach discharge slurry obtained as described in Example 2 was passed over a 150 micron screen to remove pellets containing elemental sulphur and unleached sulphides and the undersize fraction was subjected to flotation to further remove residual elemental sulphur and unleached sulphides. Sixty-seven percent of the silver, 98.5% of the lead and 31% of the zinc in the second stage leach residue reported to the flotation tailings.

The flotation tailings was filtered and washed and a portion of the wet cake, 400 g solids containing 0.2% Cu, 20.8% Fe, 28.6% Pb, 0.054% Ag and 2.2% Zn was charged to a 1 gallon (3.8 L) titanium-lined laboratory autoclave along with 2.2 L solution containing 5.5 g/L $H_2SO_4$ and 45 g/L $SO_2$. The mixture was heated to 150° C. with agitation, for 20 minutes. The compositions of the test products are given in Table III below. Overall zinc extraction increased to 95% including the reducing leach. Overall recovery of lead and silver to the reducing leach residue was 98% and 66% respectively.

TABLE III

| Product | Analysis, % or g/L | | | | | |
|---|---|---|---|---|---|---|
| | Cu | Fe | Pb | Ag | $SO_4$ | Zn |
| Solids | 0.45 | 0.57 | 58.8 | 0.098 | 27.1 | 0.04 |
| Solution | NA | 36.1 | NA | 0.001 | NA | NA |

NA - Not analyzed.

EXAMPLE 4

Two-Stage Leach

Bulk concentrate, 1.79 kg containing 0.7% Cu, 18.4% Fe, 7.6% Pb, 0.022% Ag, 34.6% S and 28.5% Zn was combined with 5.0 L of synthetic solution containing 8.3 g/L Fe, 68.3 g/L $H_2SO_4$, 74.5 g/L Zn, 0.18 g/L calcium lignosulphonate and 0.36 g/L quebracho, in an 11.4 L titanium-lined autoclave. The mixture was heated to 150° C. under agitation, for two hours. Oxygen was continuously sparged into the vessel to maintain an oxygen overpressure of 350 kPa. The product slurry from this first stage leach was filtered and the solids were combined with 2.5 L of synthetic spent electrolyte containing 120 g/L $H_2SO_4$, 50 g/L Zn, 0.18 g/L calcium lignosulphonate and 0.36 g/L quebracho in a 3.8 L titanium-lined autoclave. The mixture was heated to 150° C. for two hours, under agitation. Oxygen was continuously sparged into the vessel to maintain an oxygen overpressure of 350 kPa. The product slurry from this second stage leach was screened through a 150 micron screen and the two solids fractions were analyzed separately. Analyses for the two size fractions and for the combined solids, 1.23 kg, are included in Table IV below, which gives chemical analyses for the products of the two stage leach. Overall zinc extraction in two stages of leaching was 97%, compared with 92.5% in Example 2, and the increase in zinc extraction in this example may be accounted for by the increased retention time in the leaching stages, and the higher acidity of the second stage leach discharge solution. The deportment of 83% of the zinc in the two stage leach residue to the minus 150 micron solids fraction indicates a potential overall zinc extraction in excess of 99%, after treatment of this fraction in a reducing leach with sulphur dioxide. The two stage leach minus 150 micron fraction also contained 98.9% of the lead and 74.5% of the silver found in the feed. Recovery of greater than 98% of the lead and greater than 73% of the silver in the feed would be expected to the reducing leach residue following treatment of the minus 150 micron fraction of the two stage leach residue in a reducing leach with sulphur dioxide.

TABLE IV

| Product | Analysis, % or g/L | | | | | | |
|---|---|---|---|---|---|---|---|
| | Cu | Fe | Pb | Ag | S | $H_2SO_4$ | Zn |
| 1st Stage Solution | 0.8 | 0.3 | NA | NA | NA | 4.2 | 147 |
| 2nd Stage | | | | | | | |
| Solids, +150 μm | 0.4 | 30.3 | 0.2 | 0.014 | 67.7 | NA | 0.4 |
| Solids, −150 μm | 0.1 | 21.9 | 22.9 | 0.057 | 12.4 | NA | 2.5 |
| Solids, total | 0.3 | 26.8 | 9.7 | 0.032 | 44.6 | NA | 1.3 |
| Solution | 1.9 | 1.3 | NA | NA | NA | 34.8 | 115 |

NA - Not analyzed.

The process of the present invention provides a number of important advantages. The process permits hydrometallurgical treatment of zinc and/or bulk concentrates to yield high recoveries of zinc, lead and silver and generate a marketable iron product. While the process of the invention has been directed specifically to the treatment of zinc and/or bulk concentrates containing economically significant quantities of lead and/or silver, it can equally be utilized for the treatment of zinc concentrates with little or no lead and silver values, but where the disposal of iron residues is of environmental concern. The residue treatment section of the process can be used to treat any iron precipitates produced during pressure leaching of zinc concentrates, to convert iron to a marketable hematite product.

It will be understood that changes and modifications may be made in the embodiments of the invention without departing from the scope and purview of the appended claims.

We claim:

1. A process for recovering zinc and iron from zinc- and iron-containing sulphidic concentrate which also contains lead and silver comprising leaching the concentrate under oxidizing conditions at a temperature in the range of about 130° to 170° C. in aqueous acidic sulphate solution in a first stage leach, maintaining a mole ratio of acid to zinc plus lead in the concentrate in the range of 0.55:1 to 0.85:1 in the first stage leach to produce a leach solution of low acid and dissolved iron content for recovery of zinc therefrom, separating the leach residue from the first stage leach solution, leaching the leach residue from the first stage leach under oxidizing conditions at a temperature in the range of 130° to 170° C. in aqueous acidic sulphate solution in a second stage leach, maintaining a mole ratio of acid to zinc plus lead in the leach residue from the first stage leach in the range of 1.2:1 to 1.4:1 in the second stage leach to produce a leach solution high in zinc and a leach residue containing precipitated iron, lead, silver, sulphur, and unleached sulphides, separating the second stage leach solution from the leach residue, recycling the second stage leach solution to the first stage leach, separating the lead, silver and iron from the sulphur and unleached sulphides in the second stage leach residue, leaching the lead, silver and iron residue of the second stage leach residue in aqueous acid sulphate solution under reducing conditions in a third stage leach to produce a leach residue containing lead and silver and a leach solution containing iron in the ferrous state, neutralizing the leach solution from the third stage leach for the removal of impurities from the solution, and treating the said neutralized leach solution under oxidizing conditions at a temperature in the range of about 170° to 200° C. for the removal of iron therefrom as hematite.

2. A process as claimed in claim 1, recycling the neutralized solution after iron removal to the first stage leach.

3. A process as claimed in claim 1, providing reducing conditions in the third stage reducing leach by adding sulphur dioxide.

4. A process as claimed in claim 3, adding elemental sulphur to the third stage reducing leach to precipitate copper.

5. A process as claimed in claim 4, in which the leach solution from the first stage leach is neutralized to a pH of about 5 under oxidizing conditions for the precipitation of iron to produce a zinc sulphate solution containing less than 5 mg/L Fe for the recovery of zinc therefrom.

6. A process as claimed in claim 2 in which the leach solution containing iron in the ferrous state from the third stage reducing leach is neutralized in a first stage neutralization to a pH of about 1 with limestone or lime addition to produce a gypsum residue, and the neutralized solution further neutralized in the second stage neutralization to a pH of about 4.5 by the addition of lime or limestone for the removal of impurity elements therefrom prior to the removal of iron therefrom.

7. A process as claimed in claim 5 in which the precipitated iron from the second stage leach and from the neutralized solution from the first stage leach is fed to the third stage reducing leach for dissolution of the precipitated iron in the ferrous state.

8. A process as claimed in claim 2 in which the mole ratio of acid to zinc plus lead in the concentrate in the first stage leach is maintained at about 0.7:1.

9. A process as claimed in claim 8, in which the mole ratio of acid to zinc plus lead in the leach residue in the second stage leach is maintained at about 1.3:1.

10. A process for recovering zinc and iron from zinc- and iron-containing sulphidic concentrate which also contains lead and silver comprising leaching the concentrate under pressurized oxidizing conditions at a temperature in the range of abonut 130° to 170° C. in aqueous acidic sulphate solution in a first stage leach, maintaining a mole ratio of acid to zinc plus lead in the concentrate of about 0.7:1 in the first stage leach to produce a leach solution of low acid and iron content for recovery of zinc therefrom, separating the leach residue from the first stage leach solution, leaching the leach residue from the first stage leach under pressurized oxidizing conditions at a temperature in the range of 130° to 170° C. in aqueous acidic sulphate solution in a second stage leach, maintaining a mole ratio of acid to zinc plus lead in the leach residue from the first stage leach of about 1.3:1 in the second stage leach to produce a leach solution high in zinc and a leach residue containing precipitated iron, lead, silver, sulphur, and unleached sulphides, separating the second stage leach solution from the leach residue, recycling the second stage leach solution to the first stage leach, separating the lead, silver and iron from the sulphur and unleached sulphides in the second stage leach residue, leaching the lead, silver and iron residue of the second stage leach residue in aqueous acid sulphate solution under reducing conditions in a third stage leach to produce a leach residue containing lead and silver and a leach solution containing iron in the ferrous state, neutralizing the leach solution from the third stage leach for the removal of impurities from the solution, and treating the said neutralized leach solution under oxidizing conditions at a temperature in the range of about 170° to 200° C. for the removal of iron therefrom as hematite.

* * * * *